2 Sheets--Sheet 2.
W. W. WHITAKER.
Changeable Gage Car-Trucks.
No. 142,751. Patented September 9, 1873.
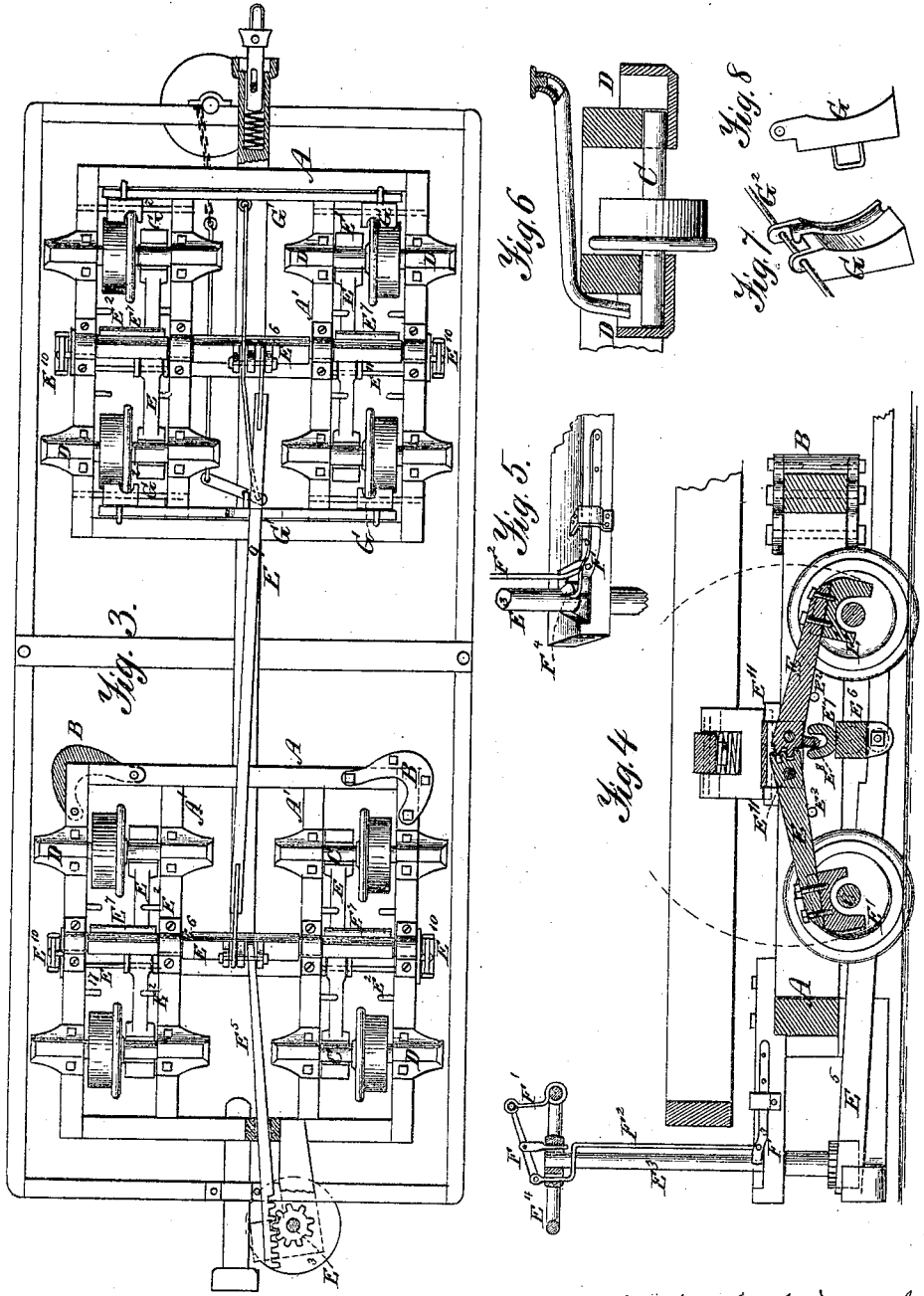
Witnesses.
A. Ruppert,
N. Bradford
W. W. Whitaker
Inventor.

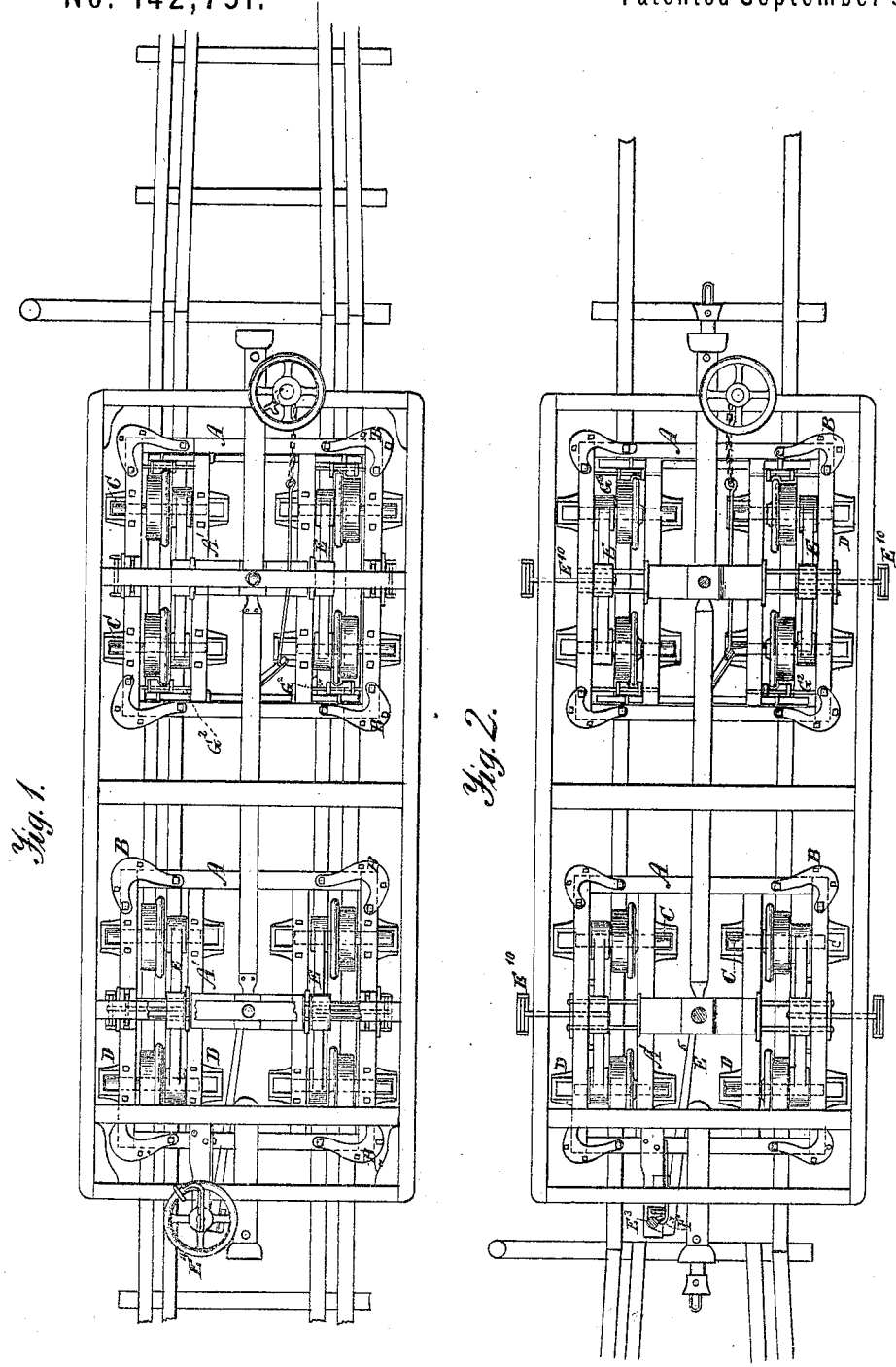

UNITED STATES PATENT OFFICE.

WILLIAM W. WHITAKER, OF GLOVERSVILLE, NEW YORK.

IMPROVEMENT IN CHANGEABLE-GAGE CAR-TRUCKS.

Specification forming part of Letters Patent No. 142,751, dated September 9, 1873; application filed March 11, 1873.

*To all whom it may concern:*

Be it known that I, WILLIAM W. WHITAKER, of Gloversville, in the county of Fulton and State of New York, have invented a new and useful Improvement in Trucks for Railway-Cars; and I do hereby declare that the following is a full, clear, and exact description of the same, reference being had to the annexed drawings making a part of this specification, in which—

Figure 1 is a plan of the four-wheeled trucks of a railway-car, showing the wheels as adapted to a wide-gage track. Fig. 2 is a like plan, showing wheels as adapted to a narrow-gage track. Fig. 3 is a bottom view of the trucks. Fig. 4 is a vertical longitudinal section of one truck. Fig. 5 is a perspective view of the lock for securing the adjustable lock-bars. Fig. 6 is a vertical section of one side of a truck, showing the means of oiling the inner ends of the short axles. Fig. 7 is a perspective view of an adjustable brake-shoe. Fig. 8 is a side elevation of the same.

My invention relates to an improvement in railway-cars, designed to enable the same car to be run from a gage of one width onto a track of another gage, thus avoiding the expense and delay of transhipment. My improvement consists in combining, with wheels and short independent axles which are adjustable by sliding laterally within their boxes, lock-bars which may be shifted from one side of the wheels to the other, for confining the wheels when adapted to either a wide or narrow gage track; and, also, in combining, with such adjustable wheels, adjustable brake-shoes moving laterally with the wheels as they are shifted from one gage to another; and, also, in certain details of mechanism, to be hereinafter specifically indicated and claimed.

In the annexed drawings, A indicates the frame of the truck, formed of four pieces of timber framed together, and to these are also framed the pieces A', which are intended to support the inner bearings of the axles. To strengthen the corners, I employ metallic brackets B, formed to fit outside of the corners, and having flanges above and below, through which bolts are passed through both the timbers forming the angle. Instead of hanging two wheels on each axle, in the ordinary manner, I attach them to short axles revolving independently in boxes attached to the side pieces of the frame A and the cross-pieces A'. These boxes D are made with bearings of such width that the wheels may be shifted from one gage of track to another, the axles, for this purpose, sliding longitudinally in their boxes. I have invented a box especially adapted for this purpose, which will be made the subject of another application, and to which I refer for more specific description of the box. When the wheels have been adjusted they are held in position by lock-bars E, which fill the space between the hub of the wheel and the beams of the frame A or A', accordingly as the wheels are adapted to a wide or narrow gage. They are formed of a lever and head, $E^1$, the latter embracing the axle, but not touching it, being supported by stops $E^2$ projecting from the frame. In order that the wheels may be shifted, it is necessary that the heads should be raised above them, and this is effected by the following mechanism: The two levers are suspended upon rods passing through holes in metallic boxes, by which the lock-bars are capable of being slid from side to side, the levers being pivoted to these boxes, and having their ends, where they meet, formed with teeth, engaging one another like those in spur-gearing, as shown in Fig. 4. The lock-bars are actuated by the shaft $E^3$ and hand-wheel $E^4$. On the bottom of the latter is a spur-pinion engaging a rack on the connecting-rod $E^5$. This rod is attached by a bolt to lugs on the lower side of the rock-shaft $E^6$, which oscillates in bearings attached to the frame A A'. On the upper side of this rock-shaft there is a concave projection, $E^7$, extending across between the side pieces of the frame A to the cross-pieces A', so as to engage, at any point along its length, with a projection, $E^8$, attached to one of the levers of the lock-bars, so that, when the shaft $E^6$ is turned, the head of the lock-bar will be raised or lowered so that the wheel may pass under it. The lock-bars are all raised or lowered simultaneously, as the opposite ends are engaged in each set, and two sets are operated upon each truck; and the shafts $E^6$ of the two trucks are connected by means of a rod, $E^9$, extending from lugs below one shaft to other lugs below the other shaft. When the wheels are thus freed from the heads $E^1$, the car may be pushed or drawn upon the converging track, which is so laid that the inside guard-rails, which are laid parallel to the rails of the track, as shown in Fig. 1, bearing against the flanges, will force the wheels apart, shifting them from a narrow to a wide gage; or, vice versa, the track-rails will force the wheels toward one another in shifting from a wide to a narrow gage. When the wheels have thus been shifted, the lock-bars are also shifted by hand, sliding on the rods upon which they are suspended, as operated upon by means of the rods $E^{10}$; and when all are thus shifted, they are simultaneously lowered by means of the hand-wheel. To prevent accidents from carelessness or otherwise, the hand-wheel should be locked when the lock-bars are in place. This may be done by means of the lever F, which has its fulcrum on the hand-wheel, and the long arm may be attached thereto by a link and padlock. The short arm of the lever is attached to the rod $F^2$, which actuates a spring-latch on the frame of the platform, engaging a stop, $F^4$, on the shaft $E^3$, and preventing the shaft from revolving until the latch is lifted. The brakes are operated in the usual manner; but, as it is necessary that the brake-shoes G should be shifted at the same time as the wheels, they are hung upon rods $G^2$ passing through lugs, upon which they slide, as also upon the brake-bars $G^1$, upon which they are loosely fastened by a stirrup. (Shown in Fig. 8.) The shoe is also fitted to the entire periphery of the wheel, flange as well as tread, the latter being received in a concavity in the face of the shoe, so that the shoe shall travel on its guide-rods, with the wheel, as the latter is shifted from side to side.

I am aware that short independent axles adjustable to tracks of different gage have been used. I do not, however, wish to limit my claim, in the combination hereinbefore alluded to, to wheels adjustable in precisely the manner set forth; for, instead of having the wheels slide in the boxes, it is evident that sliding boxes may be used in the same combination. So, also, the device for locking the hand-wheel may be almost indefinitely varied. A lock and chain would be alone sufficient, where the same could be fastened to the hand-rail or other convenient part of the car.

What I claim as my invention, and desire to secure by Letters Patent, is—

1. In combination with the wheels and axles which are laterally adjustable, the lock-bars which are adapted to be shifted from one side of the wheels to the other, to confine the wheels when running upon either a wide or narrow gage track, substantially in the manner set forth.

2. The lock-bars pivoted and connected, substantially as set forth, so that they may be simultaneously raised to permit the wheels to be shifted.

3. In combination with the lock-bars, constructed substantially as set forth, the parts $E^5$, $E^6$, $E^7$, and $E^8$, for raising and lowering them.

4. In combination with laterally-adjustable car-wheels, adjustable brake-shoes moving with the wheels as the latter are shifted from one gage to another.

5. In combination with the truck-frame, the metallic brackets or caps fitted around the corners of the frame, and constructed with upper and lower flanges to receive bolts passing through the flanges and frame-timbers.

In testimony whereof I have signed my name to this specification in the presence of two subscribing witnesses.

WILLIAM W. WHITAKER.

Witnesses:
FRED. W. STEVENS,
EDWARD M. BARNUM.